3,093,548
FERMENTATION OF SUGAR TO ETHYL ALCOHOL IN THE PRESENCE OF PROTEOLYTIC ENZYMES

Ellis W. Coates and Julio Castro Conde, Guatemala City, Guatemala, assignors to Central Anejadora Guatemalteca, Guatemala City, Guatemala, a corporation of Guatemala No Drawing. Filed Aug. 3, 1961, Ser. No. 128,983
10 Claims. (Cl. 195—37)

This invention relates to a process for the fermentation of sugar to ethyl alcohol under conditions such that protein present is hydrolyzed by a proteolytic enzyme, and more particularly to a process for the fermentation of alcohol employing yeasts capable of elaborating not only zymase but also a proteolytic enzyme, the zymase component comprising exceptionally large amounts of phosphatase.

The fermentation of sugar to ethyl alcohol by the action of yeast is one of the oldest chemical processes known to man, and has been utilized for many centuries for the production of alcoholic beverages. Yet, although this process has been the subject of intensive investigation for many years, surprisingly little is known about it. It is still less than one hundred years since Buchner demonstrated that the fermentation does not require living yeast cells, but is the result of enzymatic action of a complex nature, due to groups of enzymes elaborated by the yeast and collectively termed zymase. Parnass showed that zymase includes invertase, which converts polysaccharides to hexoses; hexogenase, which converts glucose into glucose-6-phosphate; isonerase, which transforms glucose into fructose; zymohexase, which breaks hexose into two trioses; phosphatase, which liberates phosphoric acid from organic phosphates; triosedehydrogenase, which oxidizes phosphoglyceraldehyde into phosphoglyceric acid; mutase, which changes the position of the phosphoric radical within the phosphoglyceric molecule; enolase, which through the condensation of water gives energy to the carbon atom bonded to the phosphoric radical; and carboxylase, which splits carbohydrates without water addition. None of these enzymes is proteolytic in action.

Elaborate studies have been carried out to determine the fermentation conditions optimum for the production of ethyl alcohol. The conditions studied include yeast concentration, pH, temperature, sugar concentration, mode of addition of sugar, and so forth. Even under optimum fermentation conditions, however, the maximum concentration of alcohol that can be obtained in a reasonable time in the fermentation medium is approximately 10% to 12% by volume. At this range of alcohol concentration, fermentation stops, for reasons associated with a slowing down or stopping of the growth of the yeast in the presence of such concentrations of alcohol. It is possible under special conditions, particularly in the case of yeast adapted to high concentrations of alcohol, to continue the fermentation to alcohol concentrations as high as 18% to 20% by volume. However, these concentrations are reached only extremely slowly, and usually only after many months or years of fermentation, such as in the case of wines. Commercial processes for the production of alcohol by fermentation must be completed within a reasonable time, preferably less than five days, by which time only concentrations of from 10% to 12% alcohol are obtainable.

In accordance with the invention, it has been determined that fermentation of sugar to ethyl alcohol can be so effected as to obtain alcohol concentrations higher than 12%, of the order of 14% to 17%, by volume, and in some cases, as much as 20%, in relatively short times, usually 48 hours or less, if the fermentation is carried out under conditions such that protein present is hydrolyzed by a proteolytic enzyme. The proteolytic enzyme can be brought in contact with the protein in the sugar solution or in the fermentation medium or both, by addition of the enzyme per se or by addition of any source such as yeast or other organism containing or capable of elaborating such enzyme.

Normally, optimum results are obtained in the fermentation if there is employed as the source of proteolytic enzyme either in the fermentation, or in preparation of the sugar for fermentation, or both, a yeast capable of elaborating not only appropriate amounts of zymase but also appropirate amounts of proteolytic enzyme. Preferably, the yeast employed also elaborates as part of the zymase system appreciable quantities of phosphatase. A yeast species preferred for sugar preparation and for fermentation because it meets all of these requirements is *Saccharomyces ellipsoideus*.

If the protein is hydrolyzed during sugar preparation, no additional proteolytic enzyme need be added during fermentation, and then any yeast species capable of fermenting sugar to alcohol can be employed. Varieties which can be mentioned as exemplary are *Saccharomyces apiculatus* and *Saccharomyces pastorianus*.

The yeast employed for fermentation should be accustomed to fermentation in high alcohol media, ranging from about 10 to about 20% alcohol by volume. This is done in accordance with known techniques, by gradually increasing the alcohol content of the yeast culture medium to within the desired range, and continuing to cultivate the yeast in a culture so enriched with alcohol until the yeast has become accustomed thereto.

Any proteolytic enzyme capable of digesting or hydrolyzing protein can be employed in the process of the invention. Typical proteolytic enzymes include bromelin and papain. Yeast cultures of the above species grown on pineapple and pineapple juice are in general rich sources of bromelin, and are capable of producing it in sufficient quantity for use in the process of the invention. Similarly, yeasts grown in papaya and papaya juice are rich in papain, and are capable of elaborating this enzyme in appropriate quantities for use in the invention. In like manner, yeast can be grown on other tropical fruits such as mangos, figs, citrus fruits such as oranges, grapefruit and lemons, and maranon, in order to develop the desired proteolytic enzyme-elaborating property which is desired for the invention.

The function of protein hydrolysis by the proteolytic enzyme in the fermentation process of the invention has not been completely established by experimentation. However, it is known that molasses products from cane sugar factories are rich sources of protein. This fact has been established by Geerligs, Brown and Zerban and by Honig et al., and protein contents ranging from 3 to 9% have been observed. Protein in molasses from sugar cane because of its colloidal nature can form a natural barrier to biological changes, known in physical chemistry as the protective colloid effect. Furthermore, protein cannot be readily absorbed by yeast because of its high molecular weight. Hydrolysis of protein by proteolytic enzymes destroys any colloidal barrier which it may interpose to the fermentation process, and in addition supplies amino acids of much lower molecular weight, more readily utilized by the yeast in its metabolism. The protein thus can not only be destroyed as a barrier but also utilized as a food. However, it will be understood that the above explanation is merely advanced as a hypothesis, and is not binding since it has not definitely been established by experimental evidence. All that is definitely known is that if the protein is hydrolyzed by proteolytic enzyme in accordance with the invention, alcohol concentrations as high as 15% to 20% can be obtained in the fermentation process.

Any sugar from any source can be employed, such as starch and sugar-bearing materials. Crude molasses as obtained from sugar cane or from sugar beets is a convenient source. The sugar material ordinarily used is a high grade syrup or molasses prepared directly from sugar cane juice or by dissolving in water raw sugar, commonly known in Central and South America as panela, or raspadura. Pulverized or powdered sugar cane carries a preferred source of raw sugar. This can be prepared by any mechanical pulverizing or powdering method. Heavy duty hammer mills can be used. The coarse particles are extracted in water, or mixed with cane molasses or cane syrup or panela or raspadura solution, as a supplemental source of cane sugar supplied to the solution as it is consumed by the yeast.

In sucrose solutions and dispersions, the sucrose must be changed to invert sugar before it can be fermented. This can be done by invertase, elaborated as part of the zymase of alcohol-fermenting yeast, which can be separated from the medium in which it is grown by sedimentation or centrifuging, and then added to the sucrose solution or dispersion. The medium then is held at a temperature at which invertase acts to invert sucrose, from about 30 to 60° C.

The yeast strain capable of fermenting sugar to alcohol, i.e., of elaborating zymase, and capable of elaborating proteolytic enzyme also can be used, since it elaborates invertase, and will accordingly solubilize protein as well in such solutions, at temperatures favoring such action, from about 30° to about 70° C., usually somewhat higher temperatures than those favoring invertase activity. When proteolysis is also to be obtained, the temperature will be raised after inversion has been completed, to about 70° C., and held there until proteolysis has proceeded to completion, or to the desired extent.

If a proteolytic enzyme-elaborating yeast is used in preparing the sugar medium for fermentation, and protein therein is already substantially completely hydrolyzed, it may not be necessary to use such a yeast strain in the fermentation. Proteolytic enzyme will in any event remain with the sugar medium during fermentation, due to its introduction in the preparation of the sugar for fermentation, and can complete hydrolysis of protein remaining in the medium during fermentation.

The sugar solutions are pasteurized before being stored, and maintained under aseptic conditions until ready for use. At that time or earlier, the molasses is brought to the proper yeast nutrient balance. Syrup or molasses and/or water are added to bring the Brix density to within the range from 7 to 16°, and the mix then brought to the fermentation temperature. An actively growing starter yeast culture in the nutritive medium then is added, in an amount of from 3 to 10%, on the basis of the main batch of medium. This inoculation should give a main fermentation batch containing as high a cell content as possible. A cell content of from 150 to 200 million yeast cells per milliliter is the minimum for a good yield of alcohol in a reasonable time. From 13 to 15% alcohol is obtainable in about 72 hours, at such a cell count. The higher the cell content, the higher the rate of alcohol production. By means of sedimentation, decanting or centrifuging, the cell count can be raised, so as to introduce from 5 to 10 billion yeast cells per ml. A 6 billion count gives 13 to 15% alcohol in about 16 hours. By using active dry yeast cells, the cell count can be raised to as much as 20 billion yeast cells per ml., at which figure 13 to 15% alcohol is obtained in 6 to 8 hours.

It will be understood that in other respects the fermentation medium will be of conventional composition, and will contain conventional yeast nutrient materials in proper balance for yeast growth. Any nutrients in which the molasses employed as a fermentation base may be deficient are added, such as, inorganic nitrogen in the form of urea, ammonia, or diammonium phosphate, and the like.

It will be understood that if all protein has been hydrolyzed in the course of sugar preparation, the fermentation can be carried out under normal conditions, using conventional alcohol producing zymase yeasts.

On the other hand, if protein remains, for hydrolysis during fermentation, it has been determined that for optimum utilization of the proteolytic enzyme the fermentation conditions should be somewhat different from those of an ordinary fermentation, although of course good results can be obtained using conventional fermentation conditions.

Proteolytic enzymes are affected by the pH of the fermentation medium. Excessive alkalinity considerably reduces the rate of hydrolysis, and the point of attack on the protein may be affected. It is accordingly preferred that the pH of the fermentation medium be within the range from about 2.5 to about 5, preferably from 4 to about 5. In order to establish a pH within this range, any inorganic or organic acid can be added in a sufficient amount. For example, sulfuric acid, hydrochloric acid, and phosphoric acid, can be added.

The temperature also affects the proteolysis. Every 10° C. increase in temperature doubles the capacity of the proteolytic enzyme to hydrolyze protein. At temperatures above about 70° C. the enzyme is normally destroyed, and accordingly the fermentation is carried out at 70° C. or below. On the other hand, at unduly low temperatures the rate of fermentation is greatly reduced. Effective fermentations generally are obtained at temperatures within the range from about 30° to about 38° C.

Also of importance in most cases is the density of the fermentation medium. This density should not in general exceed about 16° Brix, and can be as low as 7° Brix without disadvantageous results. This is appreciably lower than in normal fermentations, which are carried out at more than 16° Brix.

Because of the low sugar concentration, it is usually desirable to add sugar either continuously or batchwise to the fermentation medium as sugar is consumed, so as to maintain a density within the range of 7 to 16° Brix. In a batch process, three or four increments of sugar would normally be added, and the fermentation allowed to proceed until the alcohol concentration has exceeded 12%, and is within the range from 13 to 20%. It will be appreciated that the number of incremental additions of sugar will depend upon convenience, and the size of the batch, and can be greater or less than three or four.

Samples of the medium are withdrawn from time to time, and the density determined. Additional sugar syrup or molasses then is added, as required to maintain the density within the stated range. Alternatively, syrup or molasses can be added continuously at a rate approximately equal to that of the rate of consumption of sugar by the yeast.

If no aeration is employed, 48 hours or more may be required for the fermentation. In order to shorten the fermentation time, it may be desirable to aerate the nutrient medium, and the aeration rate employed can be selected as desired to meet the requirements.

A truly continuous frmentation process can also be established in which yeast is withdrawn at a constant rate for harvesting while nutrient medium including syrup or molasses is fed in at a constant rate to replenish exhausted nutrients. A continuous process is particularly desirable from a commerical point of view.

A batch process can also be employed in which several portions of sugar are added in the course of fermentation, and the batch then allowed to stand until the sugar has been exhausted. The alcohol content at this time will be found to have reached approximately 13 to 20%.

The alcohol is recovered from the finished fermentation mix after separation of yeast in accordance with conventional methods. Distillation is usually most convenient. The yeast which is recovered from the fermentation medium is a valuable source of yeast enzymes, such as invertase, which can be recovered therefrom in accordance with known procedures.

The following examples represent in the opinion of the inventors the best embodiments of their invention.

Example A

This example describes the preparation of a strain of *Saccharomyces ellipsoideus*, having the property of elaborating substantial quantities of zymase and bromelin, the zymase including an appropriate proportion of phosphatase, *Saccharomyces ellipsoideus* was grown on fresh pineapple juice, and acclimated to an alcohol percentage of 20% by carrying out successive growths in increasing incremental percentages of alcohol from 12% until the 20% limit was reached. The nutrient medium employed in propagation of this yeast culture had the following composition:

| | Percent |
|---|---|
| Malt syrup | 15 |
| Sugar syrup | 3 |
| Pineapple juice | 82 |

A portion of the initial culture was then carried through the dona, yeast tub, and prefermentor stages to augment the volume of yeast available for use in the main fermentor.

The ability of this yeast culture to elaborate bromelin was demonstrated by the following experiment: A portion of sterile wort was fermented with a pure culture of the yeast. The fermented beer contained 15.5% alcohol by volume. Glycerine was then added to obtain a complete solution of the dispersed solids. The resulting pH was 4.6. The treated beer was filtered, and the clear filtrate cooled to approximately 2° C. Acetone was added slowly to the precipitate, giving a heavy precipitate of enzyme, while the temperature rose during the addition of actone to 8° C. The filtrate and precipitate were cooled to 1° C., and the clear supernatant liquid was then decanted. The precipitate was dissolved in aqueous hydrogen chloride, neutralized and then reprecipitated, and this precipitate again dissolved in hydrogen chloride solution. Crystallization occurred slowly. The protein-hydrolyzing value of the bromelin crystals obtained was then tested by preparing gelatin solutions with and without addition of a portion of the crystals. The gelatin solutions were incubated at 30° C. whereupon the gelatin containing the crystals liquified, and remained liquid while the gelatin not containing crystals set to a natural gel form.

Using the same procedure, a culture of *Saccharomyces ellipsoideus* grown on a normal nutrient medium not including pineapple juice failed to yield any bromelin.

Example B

Example A was repeated, with the exception that the yeast was grown on papaya juice. The nutrient medium was otherwise the same. The yeast was shown to be capable of elaborating papain by the test of Example A.

Example 1

The strain of *Saccharomyces ellipsoideus* prepared in accordance with Example A was employed in a typical batch fermentation. Into a fermentor of 48,000 gallons capacity was pumped a mix of 2,000 gallons of sugar molasses, obtained from sugar cane, with sufficient water to give a Brix density of 16°. Yeast from the prefermentor was added with sufficient sulfuric acid to adjust the pH to approximately 4.5, and with additional yeast nutrient materials, as required. The cell content was one billion yeast cells per ml. Fermentation was carried out by bringing the temperature of the batch in the fermentor to 35° C., and fermentation continued until the Brix density, determined by sampling, had dropped to 8°. Thereupon, 6,000 gallons more of syrup containing added nutrients was added, with sufficient water to bring the Brix density to 16°, and fermentation continued at 35° C. Once again, when the Brix density had dropped to 8°, 6,000 additional gallons of syrup with additional nutrients was mixed with the partially fermented beer. Again, fermentation was continued at 35° C. until the Brix density had reached 8°, whereupon a final 2,000 gallons of syrup was added in the same manner as before, and fermentation allowed to continue at 35° C. until the residual sugar content in the fermented beer was 0.18%, using the Eynon and Layne method for sugar determination. The total fermentation required 48 hours, and the final alcohol content was 15.25% by volume.

Using this same procedure, and *Saccharomyces ellipsoideus* cultures prepared in accordance with Example A, there were obtained fermentations in which the final alcohol content was 14.38%, 16.44%, 15.50% and 16.60%, respectively, by volume. Each of these fermentations required 48 hours, and the residual sugar content in each case was below 0.30%.

Under identical conditions, using ordinary *Saccharomyces ellipsoideus*, the yield of four typical runs was 10 to 10.5% by volume, showing the effect of the proteolytic enzyme bromelin on the fermentation.

The alcohol was recovered from the fermentation mix by removing the suspended materials, including yeast, by settling and subsequent decantation. Centrifuging or filtration, or a combination of these steps, also can be used. The yeast so separated may be used in part to inoculate a new batch of fermentation medium. The alcohol is separated from the filtrate by distillation or fractionation.

Example 2

Example 1 was repeated, using a cell content of 6 billion yeast cells per ml. The fermentation required only 16 hours to reach a 15% alcohol content.

Example 3

Example 1 was repeated, substituting a cell content of 20 billion yeast cells per ml., using an active dry *Saccharomyces ellipsoideus* preparation obtained by spray drying or other at low temperature methods the yeast culture of Example A. The fermentation required only 6 hours to reach a 15% alcohol content.

Example 4

Example 1 was repeated, substituting the yeast of Example B. An alcohol content of over 16% by volume was reached in 48 hours.

Example 5

The strain of *Saccharomyces ellipsoideus* prepared in accordance with Example A was employed to ferment pulverized sugar cane admixed with cane molasses, cane syrup, and panela (raspadura) solutions.

The yeast, separated by sedimentation, was added directly to these sugar bearing materials, and inversion of sucrose by enzymatic action of invertase contained in the yeast was effected at a temperature of 55° C. Next, protein was hydrolyzed and solubilized by proteolytic action of bromelin contained in the yeast at 70° C.

These specially prepared invert sugar solutions were stored under sterile conditions and used for fermentation as described in Example 1, at a Brix density of 16° and a temperature of 30 to 35° C.

The solutions were fermented to 13 to 15% alcohol on a plant scale basis within a 16 hour time cycle. These results were obtained on a continuing basis over a period of weeks in an operating distillery.

We claim:

1. A process for the fermentation of sugar to ethyl alcohol which comprises hydrolysing protein present in the sugar, and fermenting the sugar with alcohol-producing yeast selected from the group consisting of *Saccharomyces ellipsoideus* yeast grown on pineapple, and capable of elaborating bromelin, and *Saccharomyces ellipsoideus* yeast grown on papaya, and capable of elaborating papain, and accustomed to alcohol in a concentration greater than 10% up to about 20% by volume.

2. A process in accordance with claim 1 in which the *Saccharomyces ellipsoideus* is a strain grown on pineapple.

3. A process in accordance with claim 1 in which the *Saccharomyces ellipsoideus* is a strain grown on papaya.

4. A process in accordance with claim 1 which includes maintaining the density of the fermentation medium within the range from 7 to 16° Brix.

5. A process in accordance with claim 1 comprising adding sugar from time to time to replace sugar consumed by the yeast.

6. A process in accordance with claim 1 in which the fermentable sugar is molasses.

7. A process in accordance with claim 1 in which the fermentable sugar is cane sugar syrup.

8. A process in accordance with claim 7 in which the fermentable sugar comprises particulate sugar cane.

9. A process for the fermentation of sugar to ethyl alcohol, effecting 99% conversion of the sugar to ethyl alcohol, which comprises fermenting sugar in a fermentation medium comprising protein naturally occurring with the sugar with a *Saccharomyces ellipsoideus* yeast selected from the group consisting of *Saccharomyces ellipsoideus* yeast grown on pineapple, and capable of elaborating bromelin, and *Saccharomyces ellipsoideus* yeast grown on papaya, and capable of elaborating papain, and accustomed to alcohol in a concentration of from about 10 to about 20% by volume and capable of elaborating a proteolytic enzyme, while maintaining the density of the fermentation medium within the range from 7 to 16° Brix, adding additional amounts of sugar from time to time to maintain the density of the fermentation medium within the said range, maintaining the temperature of the fermentation medium within the range from 30 to 38° C. to effect fermentation of sugar and hydrolysis of protein and continuing the fermentation until less than 1% sugar by weight remains unfermented.

10. A process in accordance with claim 9 in which the sugar is molasses derived from cane sugar.

References Cited in the file of this patent

UNITED STATES PATENTS

| | | |
|---|---|---|
| 1,235,881 | Defren | Aug. 7, 1917 |
| 1,651,027 | Hixson | Nov. 29, 1927 |
| 1,917,521 | Herr | July 11, 1933 |
| 2,439,572 | Levin | Apr. 13, 1948 |

OTHER REFERENCES

Cook: The Chemistry and Biology of Yeasts, pp. 439 and 440 (1958).

Hohl: "Wallerstein Laboratories Communications," April 1939, No. 5, page 48, column 1.